(12) United States Patent
Gomez Jimenez et al.

(10) Patent No.: US 9,980,494 B2
(45) Date of Patent: May 29, 2018

(54) DOUGH PROOFING APPARATUS AND RELATED METHODS

(71) Applicants: Miguel A. Gomez Jimenez, Gig Harbor, WA (US); Troy R. Tope, Puyallup, WA (US); Steven J. Woodward, Sammamish, WA (US)

(72) Inventors: Miguel A. Gomez Jimenez, Gig Harbor, WA (US); Troy R. Tope, Puyallup, WA (US); Steven J. Woodward, Sammamish, WA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 113 days.

(21) Appl. No.: 14/827,433

(22) Filed: Aug. 17, 2015

(65) Prior Publication Data

US 2016/0050940 A1    Feb. 25, 2016

Related U.S. Application Data

(60) Provisional application No. 62/039,285, filed on Aug. 19, 2014.

(51) Int. Cl.
   *A47J 27/62* (2006.01)
   *A21C 13/00* (2006.01)

(52) U.S. Cl.
   CPC .................................... *A21C 13/00* (2013.01)

(58) Field of Classification Search
   CPC ........................................................ A21C 13/00
   USPC .......... 99/330, 468, 476, 483; 219/400, 681, 219/757
   See application file for complete search history.

(56) References Cited

U.S. PATENT DOCUMENTS

| | | |
|---|---|---|
| 3,861,378 A | 1/1975 | Rhoads et al. |
| 4,240,264 A * | 12/1980 | Nakada ................. F24F 1/0007 165/122 |
| 4,426,923 A | 1/1984 | Ohata |
| 4,587,946 A | 5/1986 | Doyon et al. |
| 4,771,163 A | 9/1988 | Thiboutot |
| 4,823,766 A | 4/1989 | Violi |
| 4,884,553 A | 12/1989 | Schwarzbacker |
| 4,975,047 A | 12/1990 | Mitsuhashi et al. |
| 5,228,385 A | 7/1993 | Friedrich et al. |
| 5,401,940 A | 3/1995 | Smith et al. |
| 5,463,940 A | 11/1995 | Cataldo |
| 5,601,070 A | 2/1997 | Hotard et al. |
| 5,789,007 A | 8/1998 | Bianco |
| 5,801,362 A | 9/1998 | Pearlman et al. |
| 5,913,967 A | 6/1999 | Eisele |
| 5,928,541 A | 7/1999 | Tsukamoto et al. |
| 6,350,965 B2 | 2/2002 | Fukushima et al. |

(Continued)

*Primary Examiner* — Thien S Tran
(74) *Attorney, Agent, or Firm* — Thompson Hine LLP

(57) ABSTRACT

A dough proofing apparatus includes a proofing chamber for holding dough during proofing operations and having a door for accessing the proofing chamber. An air duct assembly includes at least one inlet opening and at least one fan for drawing in air from the proofing chamber. At least one heating element is located within the air duct assembly for heating the air and a flow path for delivering the heated air back to the proofing chamber. A vent chamber is divided into an exhaust side and an intake side, the exhaust side fluidly connected to the air duct assembly, the intake side fluidly connected to the proofing chamber.

10 Claims, 5 Drawing Sheets

(56) References Cited

U.S. PATENT DOCUMENTS

| | | | |
|---|---|---|---|
| 6,564,699 B1 | 5/2003 | Vincente et al. | |
| 6,619,189 B1 | 9/2003 | Tippmann et al. | |
| 6,894,252 B2 | 5/2005 | Paller et al. | |
| 2004/0200823 A1* | 10/2004 | Paller | A21B 1/26 |
| | | | 219/400 |
| 2009/0139261 A1* | 6/2009 | Nakano | F24F 12/006 |
| | | | 62/455 |
| 2010/0147824 A1* | 6/2010 | Bonuso | F24C 15/325 |
| | | | 219/400 |
| 2012/0294992 A1* | 11/2012 | Sager | F24C 15/327 |
| | | | 426/231 |

\* cited by examiner

DOUGH PROOFING APPARATUS AND RELATED METHODS

TECHNICAL FIELD

This application relates generally to cabinets utilized for proofing dough (i.e., allowing the dough to rise), and more particularly to a dough proofing cabinet with an improved air flow system and arrangement for controlling cabinet humidity.

BACKGROUND

It is known to provide dough proofers of the types shown in U.S. Pat. No. 6,894,252 in which a dough proofing apparatus has a chamber for holding dough, a chamber panel including a plurality of openings distributed thereon and a heating element located outside the chamber, with an upper air flow path from the heating element back to the chamber and a lower air flow path from the heating element back to the chamber. Blowers in the form of axial fans located centrally along a height of the panel operate to cause air flow from the proofer chamber, through the chamber panel openings, and both upward and downward over the heating element and back to the chamber along both the upper air flow path and the lower air flow path. Both a heat output by the heating element and a source of water are controlled to produce a temperature condition and humidity condition within the chamber suitable for proofing dough. In order to provide some air escape in such proofers the door has been mounted to provide a gap at the door threshold.

It would be advantageous to provide a dough proofer with an improved air flow arrangement and humidity control arrangement.

SUMMARY

In one aspect, a dough proofing apparatus includes a proofing chamber for holding dough during proofing operations and having a door for accessing the proofing chamber. An air duct assembly includes at least one inlet opening for drawing in air from the proofing chamber. At least one heating element is located within the air duct assembly for heating the air and a flow path for delivering the heated air back to the proofing chamber. A vent chamber is divided into an exhaust side and an intake side, the exhaust side fluidly connected to the air duct assembly, the intake side fluidly connected to the proofing chamber.

In another aspect, a dough proofing apparatus includes a chamber for holding dough during proofing operations and having a door for accessing the chamber. An air duct assembly is located at a first side of the chamber, the air duct assembly including first and second inlet openings along an upper or lower portion thereof. First and second fans are positioned in respective alignment with the first and second openings for drawing air from the chamber into the air duct assembly. A plurality of heating elements are located within a central heating duct of the air duct assembly and extend along the central heating duct. First and second outlet ducts extend vertically and are positioned at respective sides of the central heating duct. Each outlet duct including a respective flow passage in communication with the central heating duct. The first outlet duct includes a first plurality of outlet openings for directing heated air back into the chamber and the second outlet duct including a second plurality of outlet openings for directing heated air back into the chamber.

In a further aspect, a dough proofing apparatus includes a chamber for holding dough during proofing operations and having a door for accessing the chamber. An air duct assembly includes at least one inlet opening, a fan positioned for drawing air from the chamber through the inlet opening into the air duct assembly, and a heating arrangement within a central heating duct of the air duct assembly. The heating arrangement is positioned at an intermediate location along a depth of the central heating duct such that air flowing along the central heating duct to be heated passes on both a chamber facing side of the heating arrangement and a wall facing side of the heating arrangement.

The details of one or more embodiments are set forth in the accompanying drawings and the description below. Other features, objects, and advantages will be apparent from the description and drawings, and from the claims.

DETAILED DESCRIPTION

Figure 1:
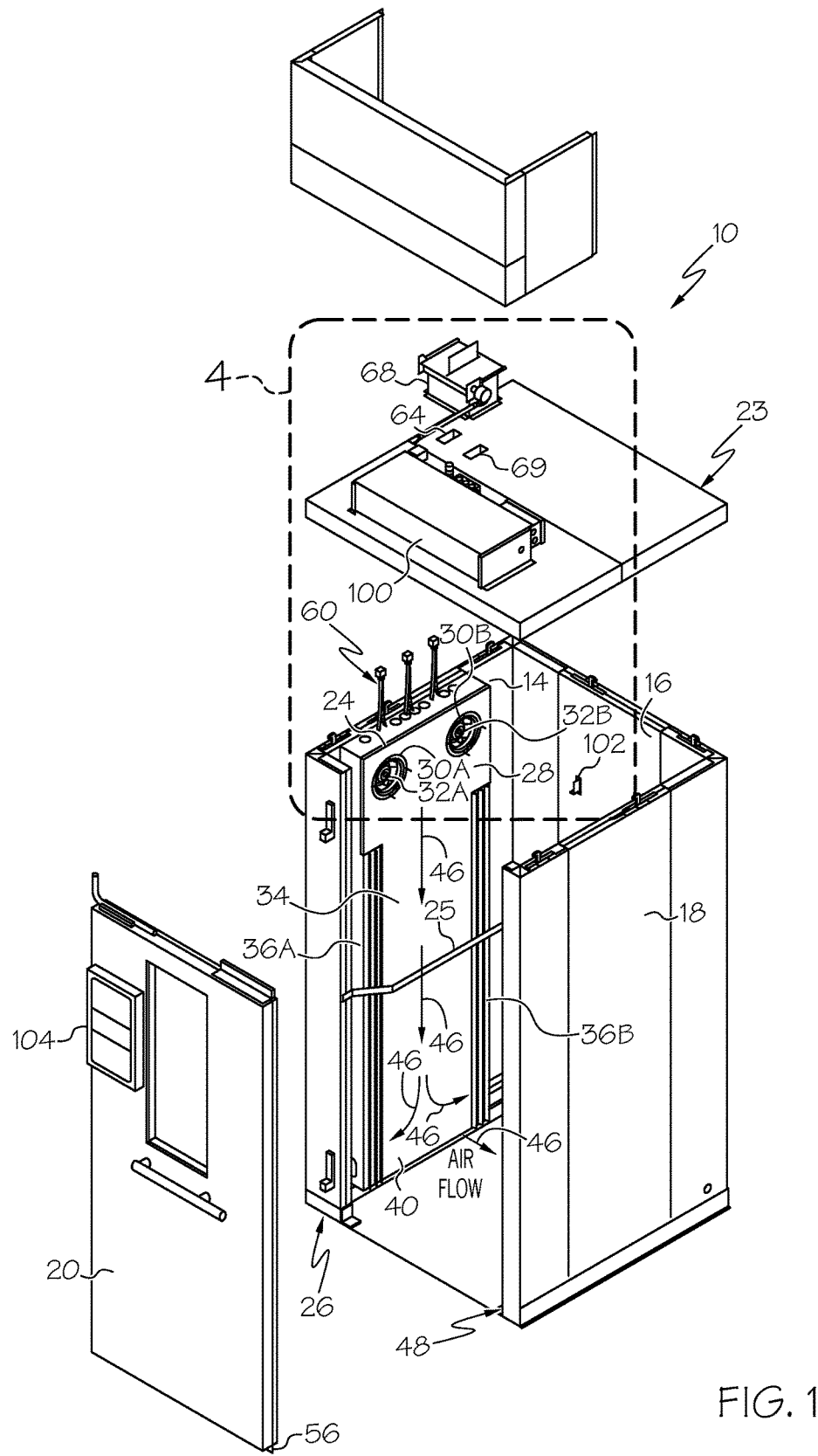
FIG. 1 is an exploded view of one embodiment of a proofing apparatus.
Figure 2:
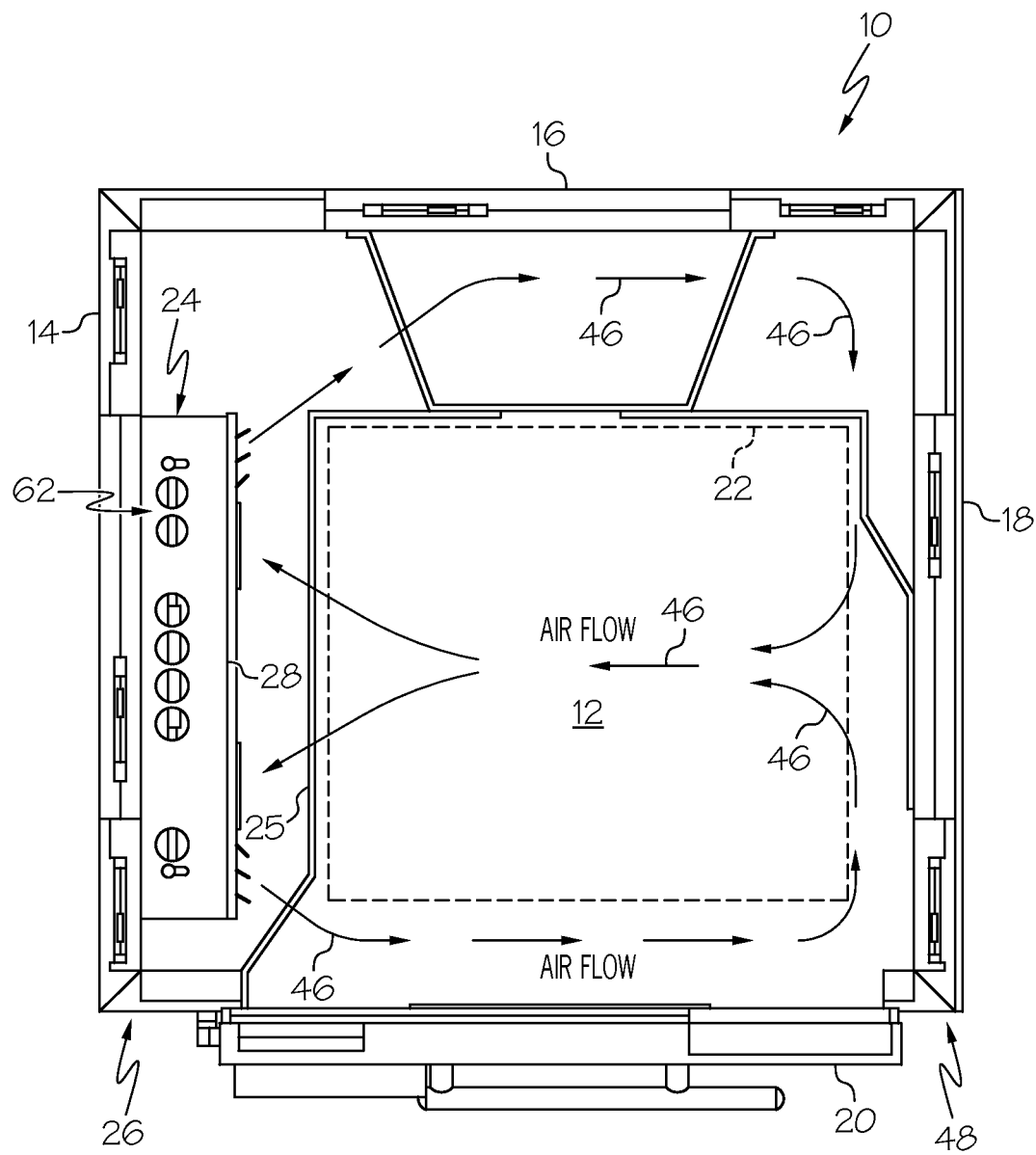
FIG. 2 is a top internal plan view of the proofing apparatus of FIG. 1.
Figure 3:
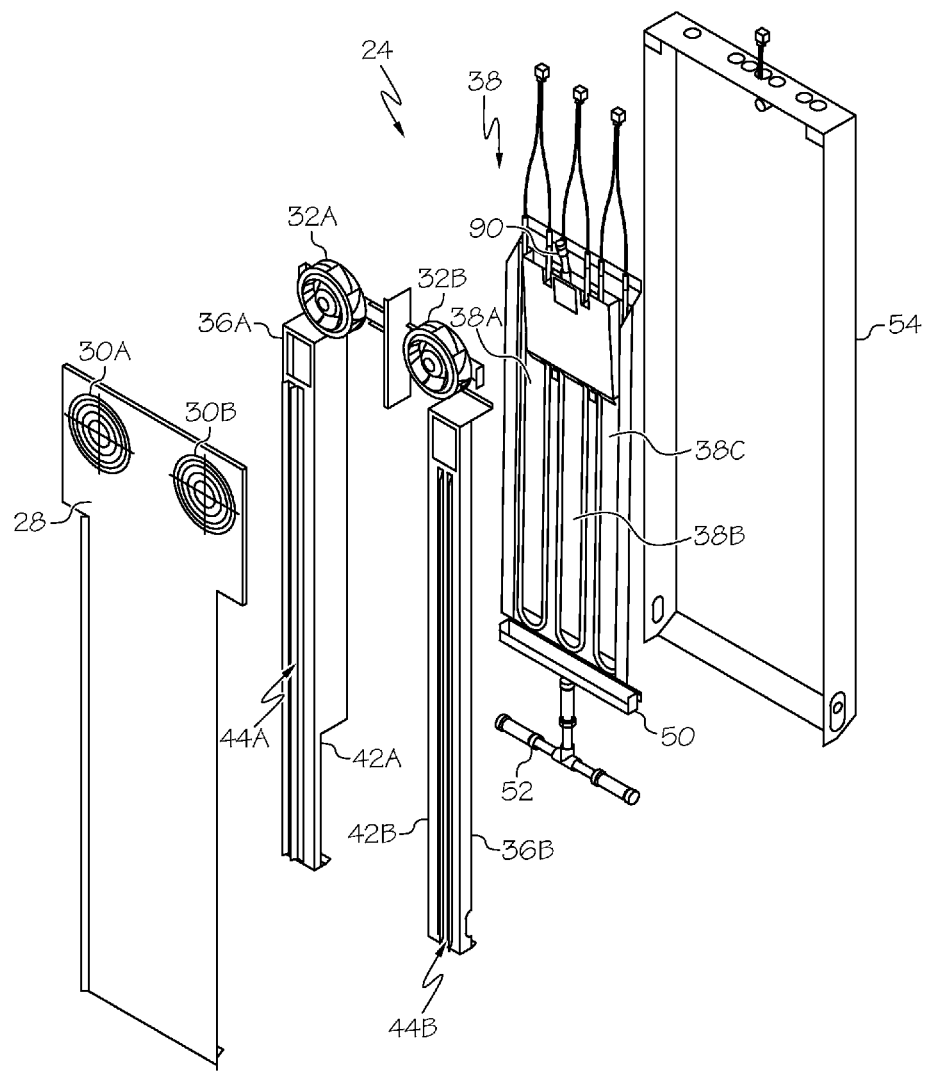
FIG. 3 is an exploded view of one embodiment of an air duct assembly for the proofing apparatus of FIG. 1.

Referring to FIGS. 1-3 a dough proofing apparatus 10 is shown and includes a proofing chamber 12 defined in part by side walls 14, 16 and 18, along with door 20 that provides access to the chamber 12 for permitting a rack 22 of dough products to be moved into and out of the chamber 12. A rack positioning guide rail 25 may be located within the chamber to aid in proper positioning of the rack 22. Top wall or ceiling 23 of the chamber is also shown in FIG. 1. An air duct assembly 24 is located at side 26 of the chamber adjacent wall 14. The air duct assembly 24 includes a chamber facing duct panel 28 including inlet openings 30A and 30B along an upper portion of the panel, where the inlet openings are spaced horizontally apart from each other. Fans 32A and 32B are positioned within the air duct assembly in respective alignment with the first and second openings 30A and 30B for drawing air from the chamber 12 into the air duct assembly. In one embodiment, each of the fans is located adjacent an internal side of the panel 28 and is a centrifugal fan, such as a backward curved centrifugal fan.

The air duct assembly includes a central heating duct 34 flanked by outlet ducts 36A and 36B. A heating arrangement 38 including a plurality of heating elements 38A, 38B and 38C (e.g., resistive heating elements) is located within the central heating duct 34 of the air duct assembly and extends downwardly along the central heating duct from the fans 32A and 32B toward a lower end 40 of the central heating duct. Notably, the heating arrangement 38 may be mounted within the duct assembly frame 54 at an intermediate location along the depth of the frame that allows air to flow along both a chamber facing side of the heating arrangement and a wall facing side of the heating arrangement. The outlet ducts 36A and 36B extend vertically and are positioned at respective sides of the central heating duct 34. Each outlet duct includes a respective flow passage 42A and 42B in communication with the central heating duct 34. Outlet duct 36A includes a plurality of outlet openings 44A for directing heated air back into the chamber 12 and outlet duct 36B includes a plurality of outlet openings 44B for directing heated air back into the chamber 12. In one embodiment, the outlet openings 44A and 44B may be formed as vertically extending, louvered elongated slots, with the louvers enabling the direction of air exiting the outlet ducts 36A and 36B to be adjusted.

Referring to FIGS. 1 and 2 the general air flow of the proofer is described with reference to air flow indicating arrows 46. During operation of the fans 32A and 32B, air flows into the air duct assembly 24 through the inlet openings 30A and 30B, where it is directed radially outward of the fans within the air duct assembly. The air then flows downward along the central heating duct 34 (e.g., along both the chamber facing side and wall facing side of the heating arrangement) to be heated by the plurality of heating elements, and then laterally into and upward along each of the outlet ducts 36A and 36B. The heated air also exits the outlets 44A, generally along the full vertical height of the outlet duct 36A, as a front or door side outlet flow which runs along the front or door side of the chamber 12 toward the right side 48 of the chamber 12, opposite side 26 where the duct assembly 24 is located. The heated air exits the outlets 44B, generally along the full vertical height of the outlet duct 36B, as a back side outlet flow which runs along the back side of the chamber 12 toward the right side 48 of the chamber 12. The front side flow moves rearward and the back side flow moves forward such that the two flows meet along the right side 48 of the chamber and collectively flow back toward the left side 26 and the duct assembly 24 through the rack zone within the chamber. The air then reenters the duct assembly via the openings 30A and 30B to be reheated and recirculated. As the air moves back from the right side 48 of the chamber toward the air duct assembly, the upper location of the fans 32A and 32B will cause the air to also move upwardly. As seen in FIG. 1, some air may also flow from a bottom opening of the central air duct 34 and laterally across the floor of the chamber to the right side 48 of the chamber, and then join with the front and rear side air flows.

As shown in FIG. 3, the duct assembly 24 may also include an internal water spraying and collection system. A water spray nozzle 90 may be selectively fed water (e.g., under control of a valve) from a water line to increase humidity within the chamber by evaporation of the water. A drain pan 50 and drain tee 52 are provided for collecting and draining any excess water.

Notably, the bottom of the door includes a sweep element 56 (FIG. 1) that makes a substantial seal at the door threshold so that air is prevented from flowing in and out of the chamber along this path.

Figure 4:
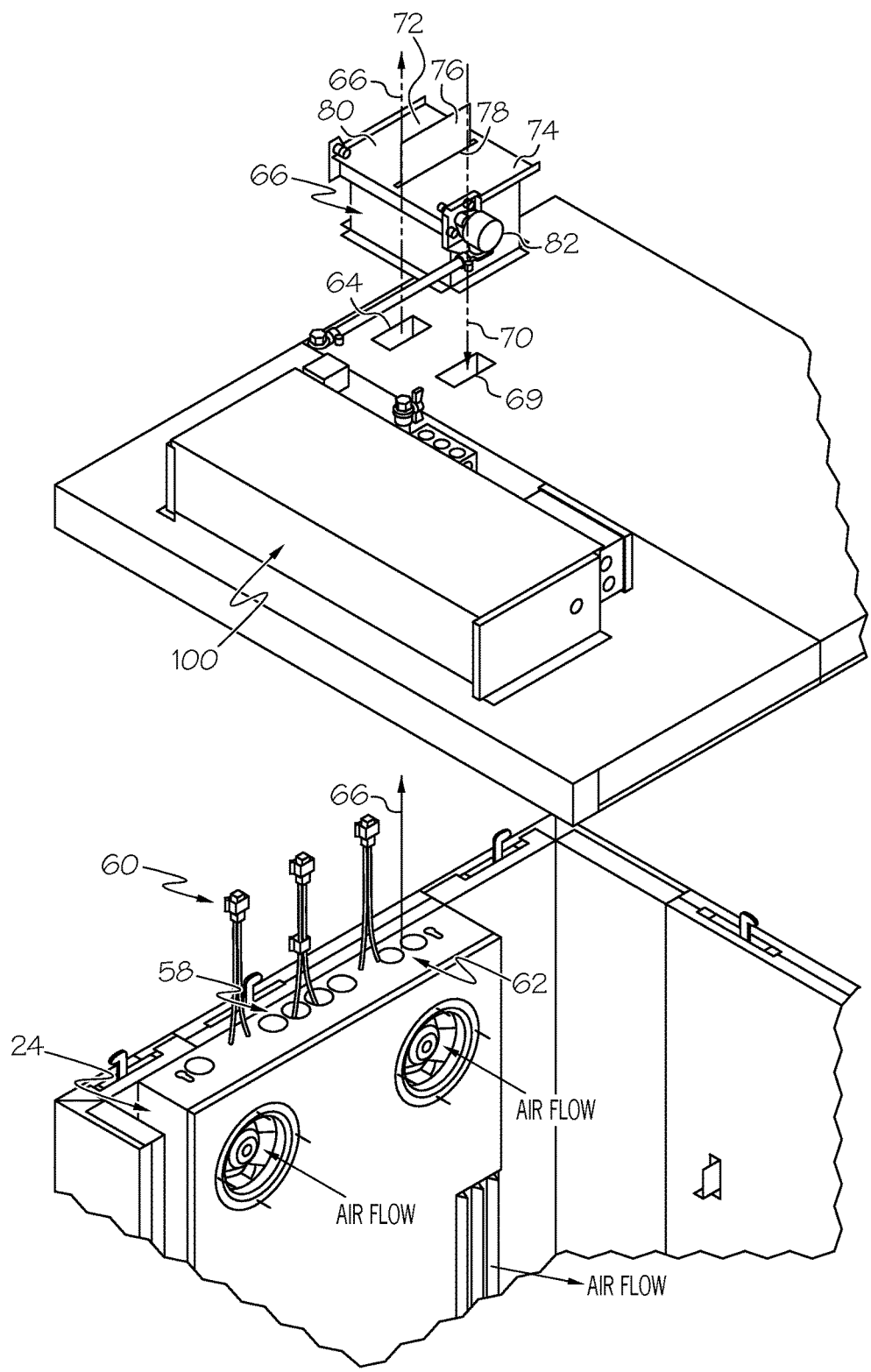
FIG. 4 is an enlarged exploded perspective view of an upper portion of the proofer apparatus of FIG. 1.

Referring now to FIGS. 1 and 4, the top of the air duct assembly 24 includes a series of openings. Openings 58 are used to run wiring etc. such as heating element harnesses 60, and may be closed or sealed after such wiring is run. Openings 62 are provided to facilitate a venting operation of the proofer in order to control humidity level within the proofer. In particular, openings 62 align with a top wall opening 64 so that air can flow (per arrows 66) from within the air duct assembly through openings 62 and top wall opening 64 into one side of an exhaust vent chamber 68 (in this case formed as a vent box structure) that sits atop the top wall, at least when the vent chamber has been opened. Likewise, when the vent chamber is open ambient air can flow (per arrow 70) into the chamber through the other side of vent chamber 68 and top wall opening 69. The top wall opening 69 leads into the proofer chamber external of the air duct assembly 24.

Figure 5:
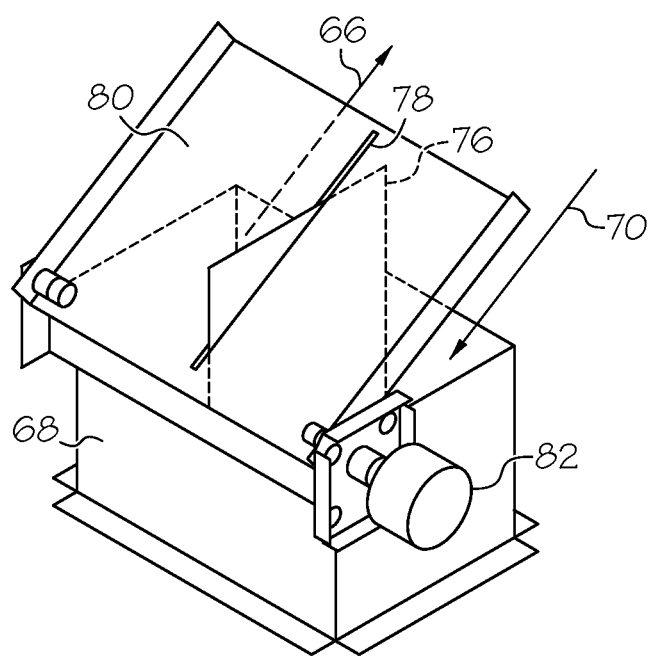
FIG. 5 is a perspective view of a vent chamber of the proofer apparatus in an open condition.

The vent chamber 68 is divided into the exhaust side 72 (aligned over toop wall opening 64) and the intake side 74 (aligned over top wall opening 69) by a dividing panel 76. The dividing panel projects upward through a slot 78 in the top panel 80 of the vent chamber 68 as shown. The top panel 80 can be selectively pivoted (e.g., by motor drive 82) between a lowered or closed, non-venting position that is illustrated in FIG. 4 (in which the top panel 80 seals (e.g., via a gasket) to the top of the vent chamber walls to substantially prevent air egress and ingress) and a raised or open, venting position that is illustrated in FIG. 5 (in which both sides of the vent chamber are open to permit air flow out of the exhaust side 72 and into the intake side 74). Notably, the upward extension of the dividing panel 76 helps prevent or limit air that is being exhausted from the proofer on exhaust side 72 from short-circuiting and being immediately pulled back into the proofer through the intake side 74.

The selective venting operation of the proofer may be carried out under control of a controller (e.g., see control box 100 atop the top wall) that is wired to control the various proofer components (e.g., heaters, fans, water valve, vent motor drive and one or more sensors). As used herein, the term controller is intended to broadly encompass any circuit (e.g., solid state, application specific integrated circuit (ASIC), an electronic circuit, a combinational logic circuit, a field programmable gate array (FPGA)), processor (e.g., shared, dedicated, or group—including hardware or software that executes code) or other component, or a combination of some or all of the above, that carries out the control functions of the proofer apparatus or the control functions of any component thereof. As seen in FIG. 1 a control interface 104 is provided on the door 20 to enable an operator to initiate and stop proofer operations and/or adjust proofer settings. The control interface 104 may include programming or other logic to effect and control the control box 100 and together the interface 104 and control box 100 may make up the controller.

Apparatus control may be according to a set humidity level for a given proofing operation, with a temperature/humidity sensor 102 (FIG. 1) provided within the chamber to monitor humidity level.

By way of example, with the vent chamber 68 closed, the controller may initially control a proofing operation by energizing the heaters and fans, and delivering water to the spray nozzle 90 to bring the proofer temperature up and raise the humidity level. If the sensed humidity level exceeds a set level for the proofing operation, the controller operates to open the vent chamber 68, causing moist air within the proofer to be exhausted and drier external ambient air to be drawn in, thereby lowering the humidity level within the proofer. When the humidity level again falls to an acceptable level, the controller operates to again close the vent chamber 68 to stop the air exchange. The proofer may also be used in a dehumidifying mode, where water is not added via the spray nozzle 90 at all. As moisture evaporates from the food product within the chamber and the humidity level rises above a set level, then the controller opens the vent chamber 68 to bring the humidity level back down to a desired level. In either case the controller will simultaneously use feedback from temperature/humidity sensor 102 to control the energization of the heating elements 38A, 38B and 38C to maintain a desired temperature for the proofing or dehumidification operation.

Notably, the fan 32B and vent chamber 68 arrangement facilitates the venting operation because the fan 32B creates a high pressure zone immediately below the air duct assembly openings 62 so that when the vent chamber 68 is in the opened for venting, air will tend to flow out of the openings 62 up through opening 64 and out of side 72 of the vent chamber 68. The outflow of air from the proofer creates a negative pressure condition within the proofer chamber 12 so that air will automatically be drawn into the proofer chamber 12 through side 74 of the vent chamber and opening 69. Thus, the single action of opening the vent chamber while the air duct assembly fan 32B is running causes both the exhausting of the proofer air and the intake of the external ambient air, without the need for use of any separate or dedicated exhaust blowers or fans. Also, the location of air being expelled from the duct assembly (i.e., upstream of the heating elements) means that the air is vented just before being heated (e.g., when it is the coolest) in order to reduce heat losses caused by the venting. The location of the ambient air entry opening 69 is external of the air duct assembly 24 but proximate the air duct assembly inlet opening 30B such that the bulk of the entering ambient air will be pulled into the air duct assembly (along with proofing chamber air) and thus the ambient air quickly mixes with the more humid proofer chamber air and is circulated throughout the proofing chamber to lower the relative humidity throughout the proofing chamber.

It is to be clearly understood that the above description is intended by way of illustration and example only, is not intended to be taken by way of limitation, and that other changes and modifications are possible. For example, while the illustrated embodiment shows the fans located in an upper portion of the air duct assembly and air movement downward along the central heating duct, in other implementations the fans could be located in a lower portion of the air duct assembly with air movement upward along the central heating duct. The location of the air duct assembly could also vary. Likewise, the number of heating elements and fans could be varied.

What is claimed is:

1. A dough proofing apparatus, comprising:
   a chamber for holding dough during proofing operations and having a door for accessing the chamber,
   an air duct assembly at a first side of the chamber, the air duct assembly including first and second inlet openings along an upper or lower portion thereof, first and second fans positioned in respective alignment with the first and second openings for drawing air from the chamber into the air duct assembly, a plurality of heating elements within a central heating duct of the air duct assembly and extending along the central heating duct, first and second outlet ducts extending vertically and positioned at respective sides of the central heating duct, each outlet duct including a respective flow passage in communication with the central heating duct, the first outlet duct including a first plurality of outlet openings for directing heated air back into the chamber and the second outlet duct including a second plurality of outlet openings for directing heated air back into the chamber,
   a vent box and having a divider separating the vent box into an exhaust side and an intake side;
   wherein the air duct assembly includes at least one vent outlet opening that is fluidly connected to the exhaust side of the vent box, and the chamber includes a chamber inlet opening fluidly connected to the intake side of the vent box.

2. The apparatus of claim 1 wherein the vent box includes a panel movable between a closed position of the vent box and an open position of the vent box, when the panel is in the open position operation of the first and second fans creates a high pressure condition proximate the vent outlet opening of the air duct assembly to move air from within the proofer apparatus into the exhaust side of the vent box and then to ambient surroundings, which in turn creates a low pressure condition within the chamber causing ambient air to move from ambient surroundings into the intake side of the vent box and then through the chamber inlet opening.

3. The apparatus of claim 2, further comprising:
   a sensor;
   a controller operatively connected with the sensor and the vent box, the controller configured to effect movement of the panel of the vent box from the closed position to the open position when the sensor indicates a chamber humidity condition in excess of a set threshold.

4. A dough proofing apparatus, comprising:
   a chamber for holding dough during proofing operations and having a door for accessing the chamber,
   an air duct assembly including at least one inlet opening, a fan positioned for drawing air from the chamber through the inlet opening into the air duct assembly, a heating arrangement within a central heating duct of the air duct assembly, the heating arrangement positioned at an intermediate location along a depth of the central heating duct such that air flowing along the central heating duct to be heated passes on both a chamber facing side of the heating arrangement and a wall facing side of the heating arrangement;
   a vent box above the chamber and having a divider separating the vent box into an exhaust side and an intake side, the vent box having a movable panel for opening and closing the exhaust side and intake side to ambient surroundings;
   wherein the air duct assembly includes at least one vent outlet opening that is fluidly connected to the exhaust side of the vent box, and the chamber includes a chamber inlet opening fluidly connected to the intake side of the vent box.

5. The apparatus of claim 4 wherein the panel is movable between a closed position of the vent box and an open position of the vent box, when the panel is in the open position operation of the first and second fans creates a high pressure condition proximate the vent outlet opening of the air duct assembly to move air from within the proofer apparatus into the exhaust side of the vent box and then to ambient surroundings, which in turn creates a low pressure condition within the chamber causing ambient air to move from ambient surroundings into the intake side of the vent box and then through the chamber inlet opening.

6. The apparatus of claim 5, further comprising:
   a sensor;
   a controller operatively connected with the sensor and the vent box, the controller configured to effect movement of the panel of the vent box from the closed position to the open position when the sensor indicates a chamber humidity condition in excess of a set threshold.

7. The apparatus of claim 4, further comprising:
   a water spray system within the central heating duct.

8. A dough proofing apparatus, comprising:
   a chamber for holding dough during proofing operations and having a door for accessing the chamber,
   an air duct assembly including at least one inlet opening, a fan positioned for drawing air from the chamber through the inlet opening into the air duct assembly, a heating arrangement within a heating duct of the air duct assembly, the heating arrangement positioned such that air flowing along the heating duct to be heated passes over the heating arrangement;

a vent box above the chamber and having a divider separating the vent box into an exhaust side and an intake side, the vent box having a movable panel for opening and closing the exhaust side and intake side to ambient surroundings;

wherein the air duct assembly includes at least one vent outlet opening that is fluidly connected to the exhaust side of the vent box, and the chamber includes a chamber inlet opening fluidly connected to the intake side of the vent box.

9. The apparatus of claim 8 wherein the panel is movable between a closed position of the vent box and an open position of the vent box, when the panel is in the open position operation of the first and second fans creates a high pressure condition proximate the vent outlet opening of the air duct assembly to move air from within the proofer apparatus into the exhaust side of the vent box and then to ambient surroundings, which in turn creates a low pressure condition within the chamber causing ambient air to move from ambient surroundings into the intake side of the vent box and then through the chamber inlet opening.

10. The apparatus of claim 9, further comprising:
a sensor;
a controller operatively connected with the sensor and the vent box, the controller configured to effect movement of the panel of the vent box from the closed position to the open position when the sensor indicates a chamber humidity condition in excess of a set threshold.

* * * * *